(12) United States Patent
Nakane et al.

(10) Patent No.: US 9,205,510 B2
(45) Date of Patent: Dec. 8, 2015

(54) PROJECTION WELDING APPARATUS, PROJECTION WELDING METHOD AND PROJECTION WELDING STRUCTURE

(75) Inventors: Toshihiro Nakane, Yokohama (JP); Toshikatsu Danura, Yokohama (JP); Keishirou Kuroda, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 463 days.

(21) Appl. No.: 13/450,374

(22) Filed: Apr. 18, 2012

(65) Prior Publication Data

US 2012/0270061 A1 Oct. 25, 2012

(30) Foreign Application Priority Data

Apr. 19, 2011 (JP) ................... 2011-093112

(51) Int. Cl.
*B23K 9/28* (2006.01)
*B32B 15/00* (2006.01)
*A47C 7/02* (2006.01)
(Continued)

(52) U.S. Cl.
CPC ............. *B23K 11/14* (2013.01); *B23K 11/115* (2013.01); *B23K 2201/006* (2013.01); *Y10T 428/12347* (2015.01)

(58) Field of Classification Search
CPC . B23K 11/115; B23K 11/14; B23K 2201/006
USPC .......... 219/86.9, 78.01, 87, 50, 57, 86.23, 93; 428/594; 297/452.18
See application file for complete search history.

(56) References Cited

U.S. PATENT DOCUMENTS 3,085,148 A * 4/1963 McConnell ............... 219/139
3,576,963 A * 5/1971 Vowels ................. 219/92
(Continued)

FOREIGN PATENT DOCUMENTS

DE 2219333 11/1973
DE 220786 A1 4/1985
(Continued)

OTHER PUBLICATIONS

Extended Search Report issued Aug. 8, 2012 in corresponding European Application No. 12164628.5.
(Continued)

*Primary Examiner* — Dana Ross
*Assistant Examiner* — Ket D Dang
(74) *Attorney, Agent, or Firm* — Knobbe Martens Olson & Bear LLP

(57) ABSTRACT

A projection welding apparatus comprising a first electrode; a second electrode, a first and a second plate members to be welded are provided between the first and second electrodes, the second plate member includes a facing portion and an extension portion extending from the facing portion towards the first plate member and an end face of the extension portion abuts with welding projections provided on the first plate member; a pressing unit causing the second electrode to approach the first electrode, and presses the end face of the extension portion against the welding projections via the second electrode; a voltage application unit causing current to flow in the both plate members; and a stopper member, disposed between the first electrode and the facing portion, is contacted against the facing portion, and electrically connects the facing portion and the first electrode so as to bypass the first plate member.

8 Claims, 10 Drawing Sheets

(51) Int. Cl.
*B23K 11/14* (2006.01)
*B23K 11/11* (2006.01)

(56) References Cited

U.S. PATENT DOCUMENTS

| | | | |
|---|---|---|---|
| 3,831,258 A * | 8/1974 | Elbert et al. | 428/592 |
| 4,117,296 A * | 9/1978 | Becker | 219/91.21 |
| 4,168,795 A * | 9/1979 | Bennett | 228/175 |
| 4,524,497 A * | 6/1985 | Rapps et al. | 29/25.35 |
| 4,623,770 A * | 11/1986 | Kojima | 219/768 |
| 5,110,032 A * | 5/1992 | Akiyama et al. | 228/102 |
| 5,113,053 A * | 5/1992 | Umeda et al. | 219/116 |
| 5,198,633 A * | 3/1993 | Umeda | 219/89 |
| 5,283,413 A * | 2/1994 | Favre-Tissot | 219/93 |
| 5,473,133 A * | 12/1995 | Peterson | 219/93 |
| 5,743,989 A * | 4/1998 | Kumagai et al. | 156/273.9 |
| 6,037,559 A * | 3/2000 | Okabe et al. | 219/91.23 |
| 2004/0007458 A1* | 1/2004 | Fujita | 204/252 |
| 2008/0182119 A1* | 7/2008 | Arnett et al. | 428/594 |
| 2009/0078683 A1 | 3/2009 | Khakhalev | |
| 2009/0302017 A1* | 12/2009 | Khakhalev et al. | 219/137 R |

FOREIGN PATENT DOCUMENTS

| | | |
|---|---|---|
| JP | 58081579 A * | 5/1983 |
| JP | 59-215284 | 12/1984 |
| JP | S63-295072 | 12/1988 |
| JP | H01-309789 | 12/1989 |
| JP | 9-57462 | 3/1997 |
| JP | 2004-344942 | 12/2004 |
| JP | 2004-358499 | 12/2004 |
| JP | 2007-275979 | 10/2007 |

OTHER PUBLICATIONS

Notice of Reasons for Rejection mailed Jan. 27, 2015 in corresponding Japanese Patent Application No. 2011-093112.

* cited by examiner

PROJECTION WELDING APPARATUS, PROJECTION WELDING METHOD AND PROJECTION WELDING STRUCTURE

CROSS-REFERENCE TO RELATED APPLICATION

This application claims priority under 35 USC 119 from Japanese Patent Application No. 2011-093112 fled on Apr. 19, 2011, the disclosure of which is incorporated by reference herein.

BACKGROUND OF THE INVENTION

1. Field of the Invention

The present invention relates to a projection welding apparatus, a projection welding method, and a projection welding structure.

2. Description of the Related Art

Projection welding is known for welding a welded member to plural welding projections (projections) by passing current through the plural welding projections formed as welding portions to a welding member (base member), whilst pressing the welded member onto the welding projections, as described in Japanese Patent Laid-Open (JP-A) No. 9-57462.

In projection welding, the settings of the current passed through the welding projections are important. However, if a welding face of the welded member and a surface other than the welding projections of the welding member contact prior to completion of the welding between the welding projections and the welded member, splitting of the current occurs at the contact locations. When such splitting of current occurs, the current flowing in the welding projections decreases and the amount of heat generated is reduced, with this being a cause of poor welding such as, for example weld strength being reduced.

If all of the welding projections do not contact the welding face of the welded member at the same time, or at almost the same time, due to for example variation in the heights of the welding projections caused by manufacturing tolerance, or distortion of the welding face of the welded member, and particular welding projections contact the welding face of the welded member before others, the length of time during which current is being passed through the particular welding projections increases.

As a result, the amount of heat generated in the welding projections that contact the welding face of the welded member first becomes excessive, this being a cause of poor welding such as, for example molten material spattering.

In consideration of the above circumstances, an object of the present invention is to provide a projection welding apparatus, a projection welding method, and a projection welding structure in which contact is suppressed between a first plate member and a second plate member at locations other than the welding projections, whilst also being able to suppress molten material from spattering.

SUMMARY OF THE INVENTION

A first aspect of the present invention is a projection welding apparatus for welding a first plate member that has a plurality of welding projections formed on a front-face side and a second plate member, the apparatus includes: a first electrode disposed on a back-face side of a first plate member; a second electrode disposed to face the first electrode and the first plate member and the second plate member being configured to be provided between the first electrode and the second electrode, the second plate member being configured to include a facing portion that faces the front-face side of the first plate member and an extension portion that extends from the facing portion towards the first plate member and an extension direction end face of the extension portion is configured to abut with the welding projections; a pressing unit that causes the second electrode to approach the first electrode, presses the second plate member with the second electrode, and presses the end face of the extension portion against the welding projections; a voltage application unit that applies a voltage to the first electrode and the second electrode causing current to flow in the first plate member and the second plate member; and a stopper member that is electrically conductive and is disposed between the first electrode and the facing portion of the second plate member with a separation open to the facing portion, is contacted against the facing portion that is configured to be pressed by the second electrode, restricts the first electrode and the second electrode approaching each other and electrically connects the facing portion and the first electrode so as to bypass the first plate member.

According to a projection welding apparatus of the first aspect, the first electrode is disposed on a back-face side of the first plate member and the second electrode is disposed to face the first electrode, the first plate member and the second plate member are disposed between the first electrode and the second electrode. The second electrode is caused by the pressing unit to approach the first electrode, and the end face of the extension portion of the second plate member, pressed by the second electrode, presses the plural welding projections formed to the front face of the first plate member. Voltage is applied to the first electrode and the second electrode by the voltage application unit, so that current flows through the first plate member and the second plate member. Current accordingly flows in the contact portions between the welding projections of the first plate member and the end face of the extension portion of the second plate member, and the temperature of the welding projections rises due to resistive heat generation. The welding projections soften as they rise in temperature, and the softened welding projections are pressed and squashed by the end face of the extension portion of the second plate member, and the welding projections are welded to the extension portion of the second plate member.

The stopper member is disposed between the first electrode and the facing portion of the second plate member. The stopper member is disposed with a separation open to the facing portion of the second plate member. The stopper member also restricts the approach of the first electrode and the second electrode by contacting the facing portion of the second plate member pressed by the second electrode. Current can be suppressed from splitting at locations other than at the welding projections due to the stopper member restricting the approach of the first electrode and the second electrode such that the front face of the first plate member does not contact the end face of the extension portion of the second plate member. As a result, a specific amount of current flows in the contact portions between the welding projections and the end face of the extension portion, and the welding projections are heated to a specific temperature. Weld quality can accordingly be improved.

Moreover, as the stopper member is electrically conductive, when the facing portion of the second plate member contacts the stopper member, the facing portion of the second plate member and the first electrode are electrically connected through the stopper member. Current accordingly flows between the facing portion of the second plate member and the first electrode, bypassing the first plate member, and the current flowing in the first plate member is reduced as a result. Accordingly, even if a particular welding projection out of the plural welding projections contacts the end face of the extension portion earlier, molten material is suppressed from spattering due to the amount of heat generated in the welding projection that contacts the end face of the extension portion earlier being reduced.

A projection welding apparatus of a second aspect of the present invention is the projection welding apparatus of the first aspect in which the stopper member projects out from the first electrode towards the second electrode, passes through a through hole formed in the first plate member, and is disposed between the first electrode and the facing portion of the second plate member.

According to a projection welding apparatus of the second aspect, the stopper member projects out from the first electrode towards the second electrode. The through hole is formed in the first plate member. The stopper member passes through the through hole and is disposed between the first plate member and the facing portion of the second plate member.

By passing the stopper member through the through hole formed in the first plate member such that is it disposed between the first electrode and the facing portion of the second plate member in this way, the stopper member can be disposed at a specific position between the first plate member and the facing portion of the second plate member. Variation can accordingly be accommodated in the separation distance between the front face of the first plate member and the end face of the extension portion of the second plate member.

A projection welding apparatus of a third aspect of the present invention is the projection welding apparatus of the first aspect further including: a moving unit for supporting the stopper member so as to be capable of moving between a restricting position between the first plate member and the facing portion, and a retracted position away from the restricting position; and the stopper member is disposed between the first plate member and the facing portion with a separation open to the first plate member.

According to a projection welding apparatus of the third aspect, for example, after welding of the welding projections to the extension portion of the second plate member has been completed, the stopper member is moved by the moving unit away from the restricting position between the facing portion and the first plate member to the retracted position away from the restricting position. The stopper member accordingly does not impede removal of the welded first plate member and second plate member from between the first electrode and the second electrode, and the first plate member and the second plate member can easily be removed. Productivity is therefore improved.

A projection welding apparatus of a fourth aspect of the present invention is the projection welding apparatus of any one of the first aspect to the third aspect wherein the stopper member contacts the facing portion prior to the front face of the first plate member contacting the end face of the extension portion.

According to a projection welding apparatus of the fourth aspect, due to the stopper member restricting the approach of the first electrode and the second electrode prior to the front face of the first plate member contacting the end face of the extension portion of the second plate member, the extension portion of the second plate member is welded to each welding projection in a state with a separation opened between the front face of the first plate member and the end face of the extension portion of the second plate member. As splitting of the current at locations other than the welding projections is accordingly suppressed, weld quality is improved.

A fifth aspect of the present invention is a projection welding apparatus for welding a first and a second welding members, the apparatus including: a first electrode; a second electrode facing the first electrode; a press section that causes the second electrode to approach the first electrode; a voltage application section that applies a voltage to the first electrode and the second electrode; and an electrically conductive stopper member disposed between the first electrode and the second electrode, electrically connected to the first electrode and not in contact with the second electrode, wherein: first and second welding members are configured to be disposed between the first electrode and the second electrode such that current from the first electrode and the second electrode flows through the first welding member and the second welding member so as to weld together the first welding member and the second welding member; the first electrode and the second electrode can be electrically connected through the first welding member and the second welding member; and the first electrode and the second electrode can also be electrically connected through the second welding member and the stopper member so as to bypass the first welding member.

A projection welding apparatus of a sixth aspect of the present invention is the projection welding apparatus of the fifth aspect wherein the stopper member projects out from the first electrode towards the second electrode.

A projection welding apparatus of a seventh aspect of the present invention is the projection welding apparatus of the fifth aspect wherein: the projection welding apparatus further includes a moving unit for movably supporting the stopper member; and the stopper member is moved by the moving unit between a restricting position disposed between the first welding member and the second welding member, and a retracted position away from the first welding member and the second welding member.

A projection welding apparatus of an eighth aspect of the present invention is the projection welding apparatus of any one of the fifth aspect to the seventh aspect wherein: the first welding member is configured to include a base plate and plural welding projections provided to the base plate; when the second electrode is caused to approach the first electrode, the second electrode presses the second welding member against the welding projections of the first welding member; after the second welding member has contacted the welding projections of the first welding member and before the second welding member contacts the base plate of the first welding member, the stopper member contacts the second welding member, such that the first electrode and the second electrode are electrically connected to each other through the second welding member and the stopper member.

A projection welding method of a ninth aspect of the present invention includes: a stopper member placement process of disposing a first plate member formed with plural welding projections on a surface of the first plate member and a second plate member including a facing portion that faces the surface of the first plate member and an extension portion that extends from the facing portion towards the first plate member between first and second electrodes which face to each other in a state in which an extension direction end face of the extension portion abuts the welding projections, and disposing an electrically conductive stopper member between the first electrode and the facing portion with a separation open to the facing portion; and a welding process of causing the second electrode to approach the first electrode, applying a voltage to the first electrode and the second electrode to cause current to flow in the first plate member and the second plate member while the second plate member is being pressed by the second electrode and the end face of the extension portion is being pressed against the welding projections, and contacting the facing portion of the second plate member that is being pressed by the second electrode to the stopper member so as to bypass the first plate member and electrically connect the facing portion and the first electrode.

According to a projection welding method of the ninth aspect, firstly, in the stopper member placement process, the stopper member is disposed between the first electrode and the facing portion of the second plate member in a state in which an end face of the extension portion of the second plate member abuts the plural welding projections formed to the surface of the first plate member, and the first plate member and the second plate member are disposed between the first electrode and the second electrode. The stopper member is electrically conductive and is disposed with a separation open to the facing portion of the second plate member.

Next, in the welding process, the second electrode is caused to approach the first electrode, and a voltage is applied to the first electrode and the second electrode to cause current to flow in the first plate member and the second plate member while the end face of the extension portion of the second plate member that is being pressed by the second electrode presses against the plural welding projections formed to the surface of the first plate member. Current accordingly flows in the contact portions between the welding projections and the end face of the extension portion of the second plate member, and the temperature of the welding projections rises due to resistive heat generation. The welding projections soften as they rise in temperature, and the softened welding projections are pressed and squashed by the end face of the second plate member, and the extension portion of the second plate member is welded to the welding projections.

In the welding process, current is suppressed from splitting at locations other than the welding projections due to the stopper member restricting the approach of the first electrode to the second electrode such that the surface of the first plate member does not contact the end face of the extension portion of the second plate member. As a result a specific amount of current flows in the contact portions between the welding projections and the end face of the extension portion, and the welding projections are heated to a specific temperature. Weld quality can accordingly be improved.

The facing portion of the second plate member and the first electrode are also electrically connected bypassing the first plate member due to the facing portion of the second plate member contacting the stopper member. As a result current flows through the stopper member between the facing portion of the second plate member and the first electrode, and the current flowing in the first plate member is reduced. Accordingly, even if a particular welding projection out of the plural welding projections contacts the end face of the extension portion earlier, the amount of heat generated in the welding projection that contacts the end face of the welding portion earlier is reduced, and molten material is suppressed from spattering.

A projection welding method of a tenth aspect of the present invention is the projection welding method of the ninth aspect wherein in the stopper member placement process, the stopper member projecting out from the first electrode towards the second electrode is passed through a through hole formed in the first plate member and is disposed between the first electrode and the facing portion.

According to a projection welding method of the tenth aspect, in the stopper member placement process, the stopper member passes through the through hole formed in the first plate member and is disposed between the first electrode and the facing portion of the second plate member. The stopper member can accordingly be disposed at a specific position between the first plate member and the facing portion of the second plate member. Variation can accordingly be reduced in the separation between the surface of the first plate member and the end face of the extension portion of the second plate member.

A projection welding method of an eleventh aspect of the present invention is the projection welding method of the ninth aspect wherein: in the stopper member placement process, the stopper member is disposed between the first plate member and the facing portion with a separation open to the first plate member; and the projection welding method further includes, after the welding process, a retraction process of moving the stopper member from a restricting position between the facing portion and the first plate member to a retracted position away from the restricting position.

According to a projection welding method of the eleventh aspect, in the stopper member placement process, the stopper member is disposed between the first plate member and the facing portion of the second plate member with a separation open to the first plate member. In the retraction process after the welding process, the stopper member is moved from the restricting position between the facing portion of the second plate member and the first plate member to the retracted position away from the restricting position. The stopper member accordingly does not impede removal of the welded first plate member and second plate member from between the first electrode and the second electrode, and the first plate member and the second plate member can be easily removed. Productivity is therefore improved.

A projection welding method of a twelfth aspect of the present invention is the projection welding method of any one of the ninth aspect to the eleventh aspect, wherein in the welding process, the stopper member contacts the facing portion prior to the surface of the first plate member and the end face of the extension portion contacting with each other.

According to a projection welding method of the twelfth aspect, in the welding process, the approach of the first electrode and the second electrode is restricted by the stopper member prior to the surface of the first plate member and the end face of the extension portion of the second plate member contacting with each other. The extension portion of the second plate member is welded to each of the welding projections in a state in which a separation is left open between the surface of the first plate member and the end face of the extension portion of the second plate member. Current is accordingly suppressed from splitting at locations other than the welding projections, and weld quality is therefore improved.

A projection welding method of a thirteenth aspect of the present invention is a projection welding method including: a process of preparing a first welding member formed with plural welding projections on a surface of the first welding member and a second welding member including a facing portion that faces the surface of the first welding member and an extension portion that extends from the facing portion towards the first welding member, and disposing the first welding member and the second welding member between first and second electrodes which faces to each other, and placing the first welding member in contact with the first electrode; a stopper member placement process of disposing an electrically conductive stopper member between the first electrode and the second electrode, such that the stopper member is electrically connected to the first electrode and has a separation open to the second electrode; and a welding process of causing the second electrode to contact the second welding member, applying a voltage to the first electrode and the second electrode to cause current to flow in the first welding member and the second welding member while the second welding member is being pressed by the second electrode and the end face of the extension portion is being pressed against the plural welding projections on the first welding member; and a bypass process of causing the facing portion of the second welding member that is being pressed by the second electrode to contact the stopper member, so as to bypass the first welding member and electrically connect the second electrode to the first electrode through the facing portion of the second welding member and the stopper member.

A projection welding method of a fourteenth aspect of the present invention is the projection welding method of the thirteenth aspect wherein the bypass process is performed prior to the end face of the extension portion of the second welding member contacting the surface of the first welding member.

A projection welding structure of a fifteenth aspect of the present invention includes: a first plate member formed with plural welding projections on a surface of the first plate member; a second plate member including a facing portion that faces the surface of the first plate member and an extension portion that extends from the facing portion towards the first plate member and has an extension direction end face that abuts the welding projections, wherein the end face of the extension portion has been abutted and welded to the welding projections using the projection welding method of any one of the ninth aspect to the fourteenth aspect.

According to a projection welding structure of the fifteenth aspect, the end face of the extension portion of the second plate member is abutted and welded to the plural welding projections formed to the surface of the first plate member using the projection welding method of any one of the ninth aspect to the fourteenth aspect. A saving can accordingly be achieved in the manufacturing cost of the first plate member and the second plate member, whilst still obtaining a projection welding structure of improved quality.

A projection welding structure of a sixteenth aspect of the present invention is the projection welding structure of the fifteenth aspect wherein the first plate member is a panel frame for configuring a vehicle seatback.

According to a projection welding structure of the sixteenth aspect, plural welding projections are formed to the surface of the panel frame serving as the first plate member that configures a vehicle seatback, and the welding projections are abutted and welded to the end face of the second plate member. An improvement in quality and reduction in cost of the vehicle seatback can accordingly be achieved.

According to a projection welding apparatus, projection welding method and projection welding structure of the present invention configured as described above, contact between the first plate member and the second plate member at locations other than the welding projections can be suppressed, and molten material can be suppressed from spattering.

BRIEF DESCRIPTION OF THE DRAWINGS

Exemplary embodiments of the present invention will be described in detail based on the following figures, wherein:

FIG. 7A illustrates a state prior to welding, and FIG. 7B illustrates a state post-welding;

FIG. 10A illustrates a state prior to welding, and FIG. 10B illustrates a state post-welding.

DETAILED DESCRIPTION OF THE INVENTION

Figure 1:
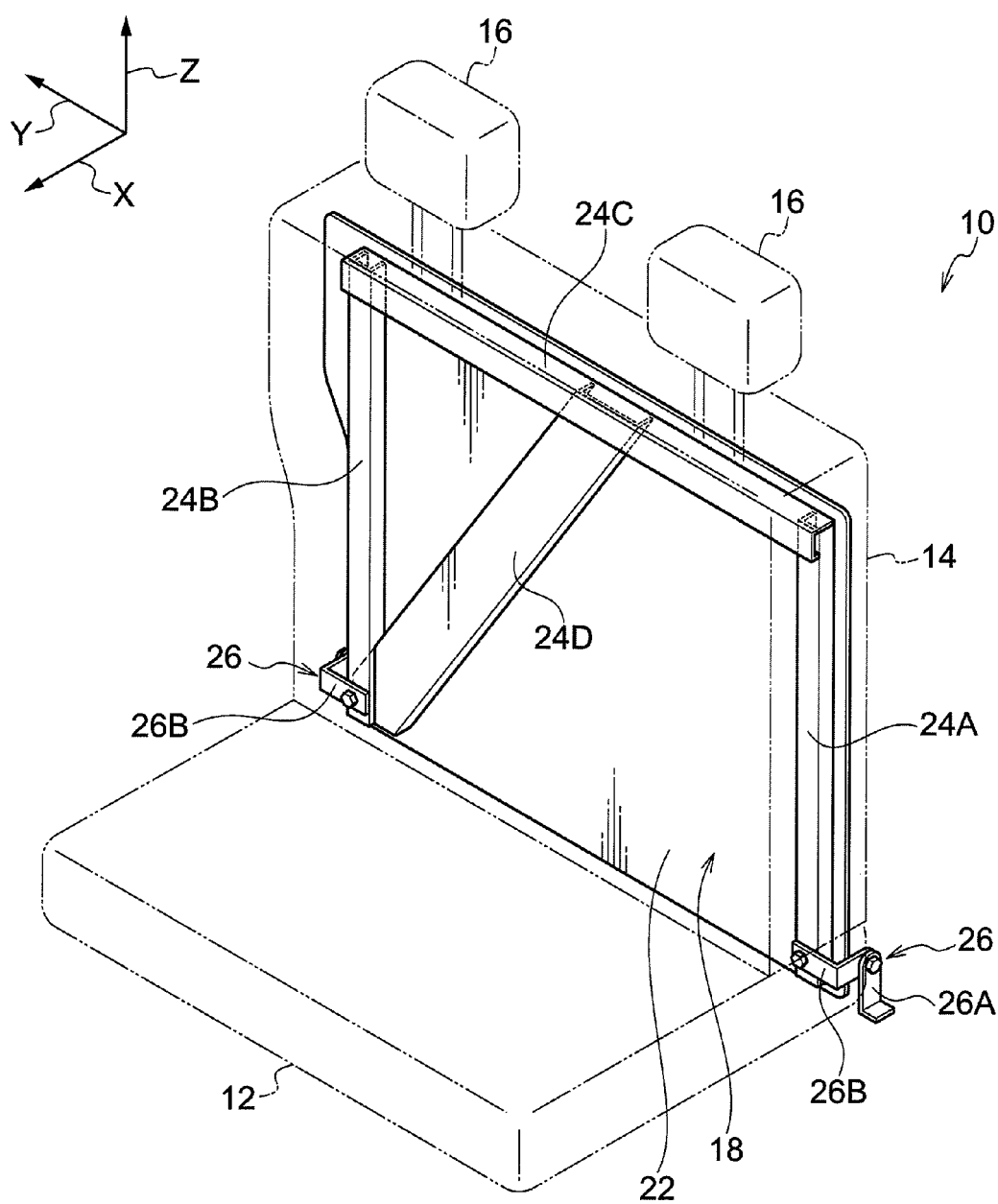
FIG. 1 is a perspective view illustrating a vehicle rear seat provided with a rear seat back frame to which a projection welding structure according to the first exemplary embodiment of the present invention has been applied.

Explanation follows regarding a projection welding apparatus, a projection welding method and a projection welding structure according to an exemplary embodiment of the present invention, with reference to the drawings. In the drawings arrows X, Y, Z respectively indicate as appropriate a seat front-rear direction front side, a seat width direction outside, and a seat height direction top side for a vehicle rear seat equipped with a rear seat back frame applied with the projection welding structure according to the present exemplary embodiment.

Explanation follows first regarding a configuration of a vehicle rear seat 10 equipped with a rear seat back frame 18 to which the projection welding structure according to the first exemplary embodiment is applied.

As shown in FIG. 1, the vehicle rear seat 10 includes: a rear seat cushion 12 for supporting the posterior region and thigh regions of a seated occupant; a rear seat back 14 for supporting the back of an occupant; and a headrest 16 provided at a top edge portion of the rear seat back 14 for supporting the head of an occupant. The rear seat cushion 12 is attached to the top face of a rear floor pan of the vehicle body, not shown in the drawings. The rear seat back 14 is for two people. The rear seat back 14 is configured as one side of a through-trunk left-right splittable tilting rear seat back. A rear seat back for one person, not shown in the drawings, is disposed at the right hand side of the rear seat back 14 shown in FIG. 1.

The rear seat back 14 is provided with the rear seat back frame 18, serving as a framework member. Cushion material is supported by the rear seat back frame 18 and covered by a seat covering, not shown in the drawings. The rear seat back frame 18 is equipped with a panel frame 22, and plural (four in the present exemplary embodiment) reinforcement ribs 24A to 24D for reinforcing the panel frame 22.

The panel frame 22 serving as a first plate member is a press component formed by press working weldable sheet metal, such as steel or iron, into a thin plate shape. A pair of rotation hinges 26 is provided at the two seat width direction edges at the bottom edge of the panel frame 22, supporting the panel frame 22 so as to be rotatable in the seat front-rear direction. Each of the rotation hinges 26 is equipped with a hinge base 26A fixed to the top face of the rear floor pan of the vehicle body, not shown in the drawings, and an L-shaped hinge arm 26B hinge-coupled to the hinge base 26A. Each of the hinge arms 26B is fixed to the reinforcement ribs 24A, 24B, such as by welding.

The plural reinforcement ribs 24A to 24D serving as second plate members are disposed on the seat front-rear direction front side of the panel frame 22. The reinforcement ribs 24A, 24B are disposed on the two seat width direction edges of the panel frame 22 with their length directions extending along the seat height direction, and the reinforcement member 24C is disposed at a top edge portion of the panel frame 22 with its length direction along the seat width direction. The reinforcement rib 24D is disposed spanning from a bottom end portion of the reinforcement rib 24B to a length direction central portion of the reinforcement member 24C. The reinforcement ribs 24A to 24D are joined to the panel frame 22 by projection welding (referred to below simply as welding) using the projection welding method according to the present exemplary embodiment.

Explanation follows regarding the projection welding structure according to a first exemplary embodiment, using the panel frame 22 and the reinforcement rib 24A as an example. As the projection welding structure for the panel frame 22 and the reinforcement ribs 24B to 24D is similar to the welding structure for the panel frame 22 and the reinforcement rib 24A, explanation thereof is omitted.

Figure 2:
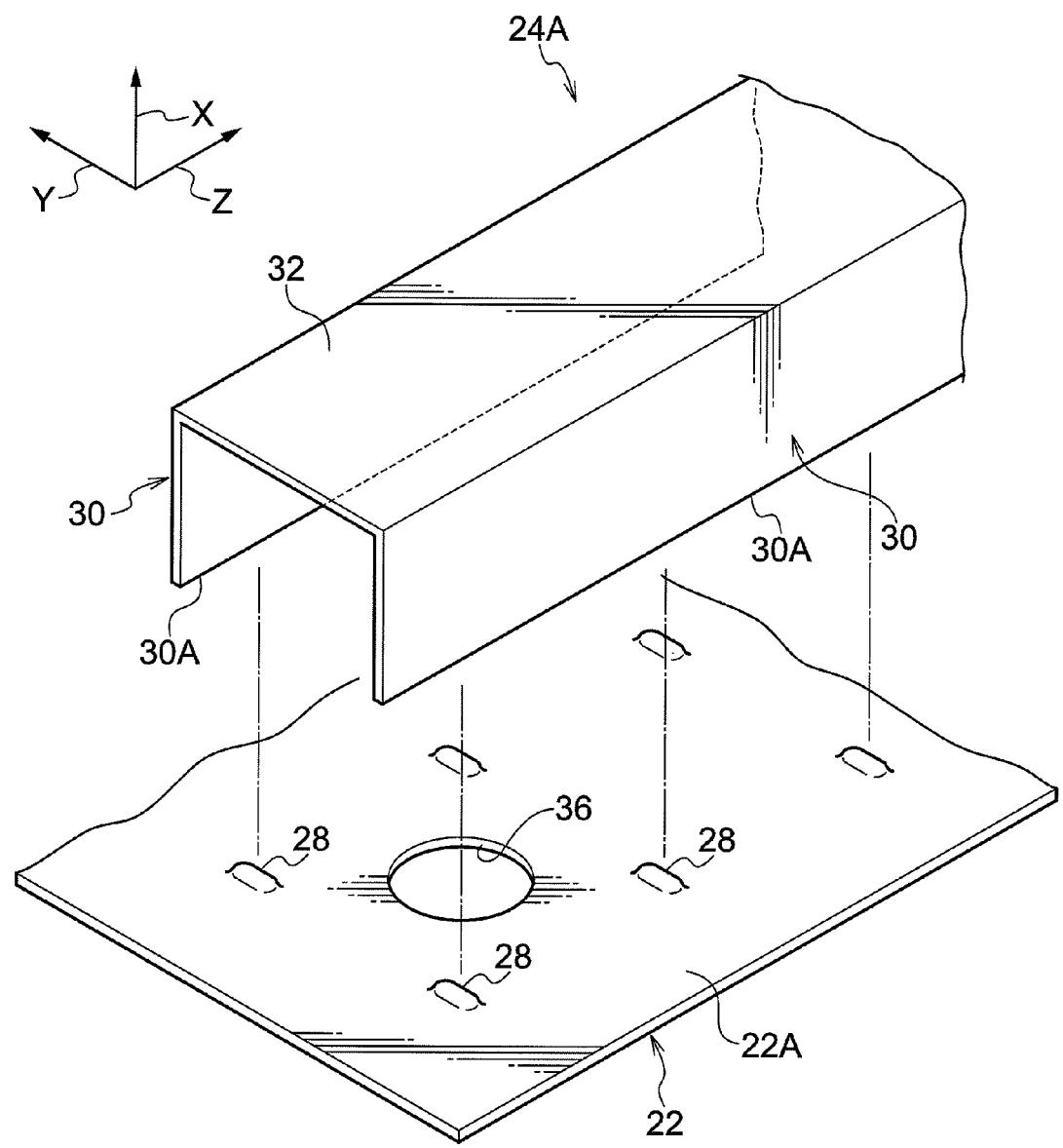
FIG. 2 is an exploded perspective view illustrating a panel frame and a reinforcement rib to which a projection welding structure according to the first exemplary embodiment of the present invention has been applied.

As shown in FIG. 2, plural welding projections (projections) 28 are formed on a surface (the face on the seat front-rear direction front side) 22A of the panel frame 22 so as to project out from the surface 22A. The welding projections 28 are formed by press forming at specific intervals along the seat height direction and seat width direction. Through holes 36 are formed in the panel frame 22 at positions corresponding to the two length direction end portions of the reinforcement rib 24A to be welded. Stopper members 44 are inserted into the through holes 36 in the projection welding method, described later.

Figure 3:
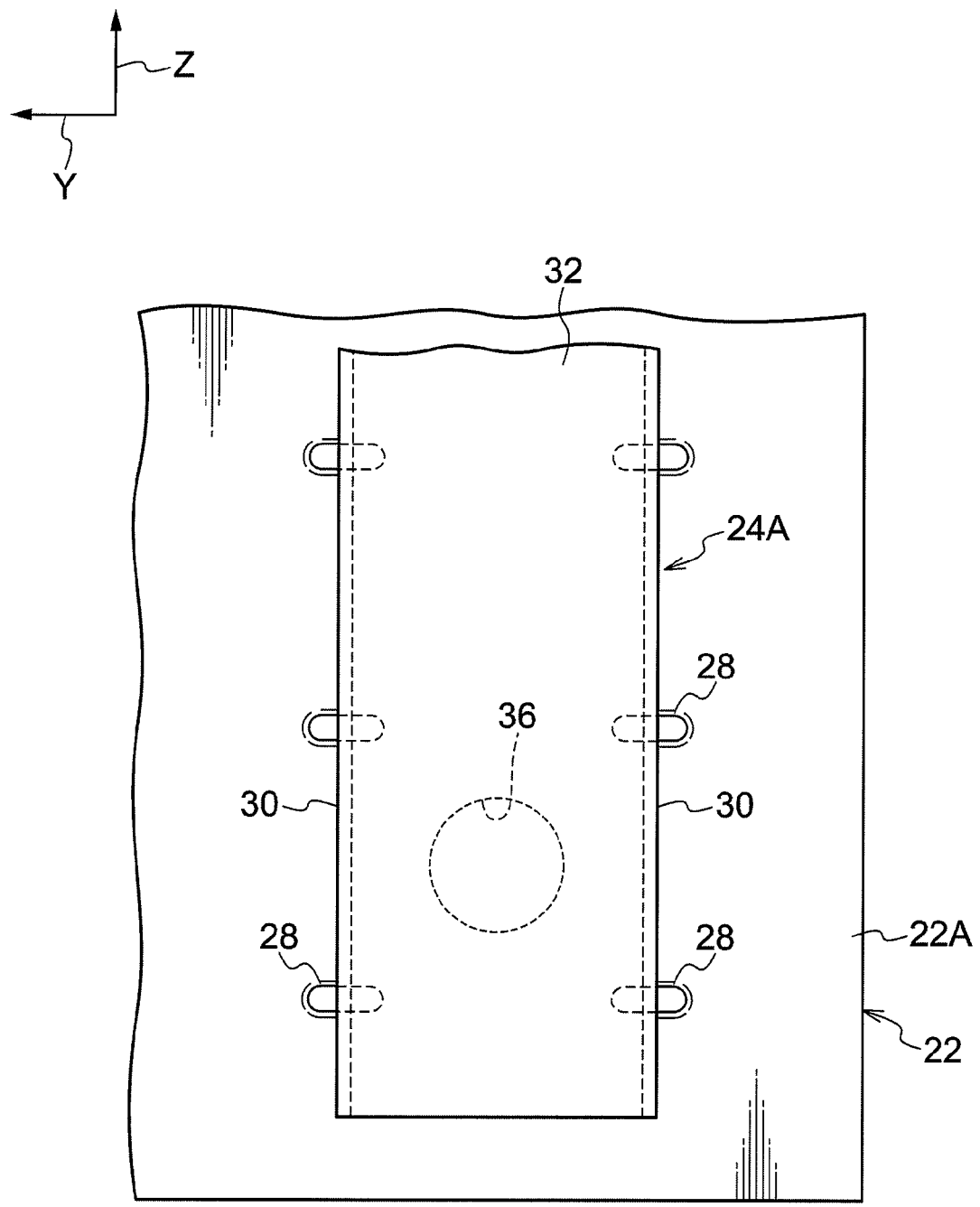
FIG. 3 is a plan view viewed from the seat front-rear direction front side illustrating a panel frame and a reinforcement rib to which a projection welding structure according to the first exemplary embodiment of the present invention has been applied.

As shown in FIG. 3, each of the welding projections 28 is formed in a substantially oval shape extending in the seat width direction that intersects (intersects substantially orthogonally in the present exemplary embodiment) with the length direction of the reinforcement rib 24A (the seat height direction). End faces 30A of flange portions 30 of the reinforcement rib 24A, described later, abut so as to be welded to major axis intermediate portions of each of the oval shapes. It is accordingly possible to accommodate positional misalignment (positioning tolerance) of the flange portions 30 in the major axis direction of the welding projections 28 when positioning the flange portions 30 on the welding projections 28.

Figure 4A:
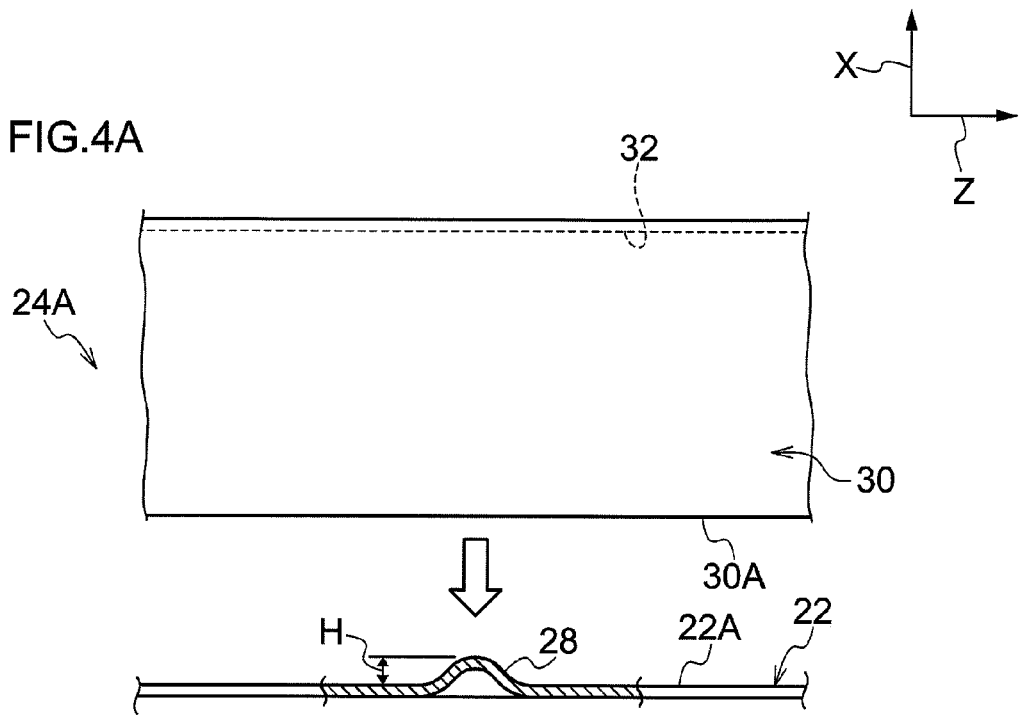
FIGS. 4A and 4B are side views viewed along the seat width direction illustrating a panel frame and a reinforcement rib to which a projection welding structure according to the first exemplary embodiment of the present invention has been applied, FIG. 4A illustrating a state prior to welding, and FIG. 4B illustrating a state post-welding.

As shown in FIG. 4A, a height H (projection amount) of the welding projections 28 is set in consideration of such factors as the plate thickness and material, at a height such that the welding projections 28 do not break when the end faces 30A of the flange portions 30 of the reinforcement member 24A are abutted and the welding projections 28 have been pressed and squashed.

As shown in FIG. 2, the reinforcement rib 24A is a thin press component formed by press working a weldable metal plate member, such as steel or iron, into a C-shaped cross-section (rectangular U-channel profile). The reinforcement member 24A includes a pair of facing flange portions 30 and a web portion 32 that joins together the flange portions 30. The reinforcement member 24A is disposed with the open side of its cross-section facing towards the surface 22A of the panel frame 22, and the web portion 32 serving as a facing portion facing the panel frame 22, and with the flange portions 30 disposed substantially perpendicular to the surface 22A of the panel frame 22. In other words, the panel frame 22 and each of the flange portions 30 are respectively disposed in substantially a T-shape, as viewed along the length direction of the reinforcement rib 24A.

Figure 4B:
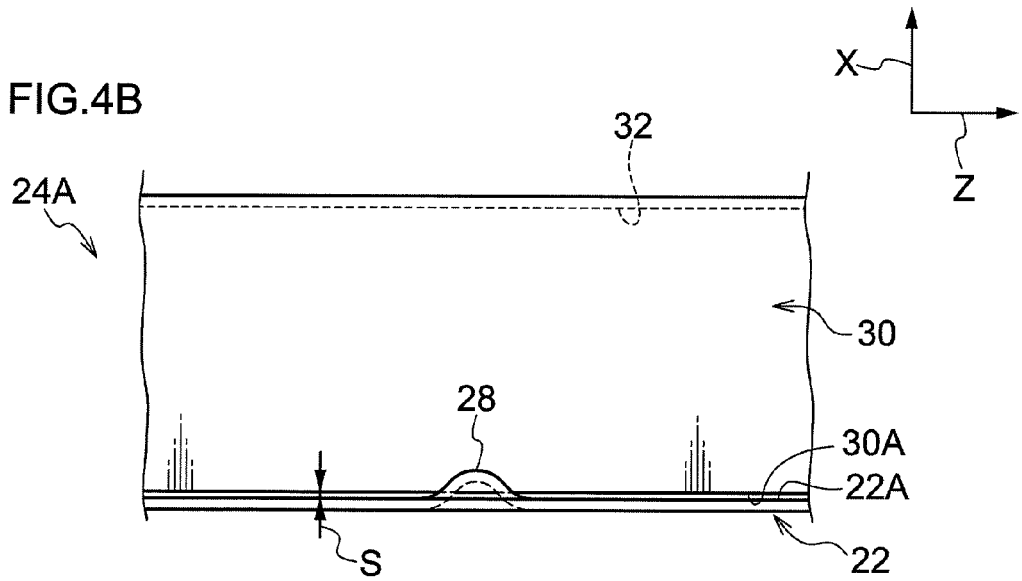

The flange portions 30, serving as extension portions, project out towards the panel frame 22 from two width direction (seat width direction) edge portions of the web portion 32. The end faces 30A at the open side of the flange portions 30 abut against and are welded to the welding projections 28 formed to the panel frame 22, as shown in FIG. 4B.

Explanation follows regarding a configuration of a projection welding apparatus according to a first exemplary embodiment.

Figure 5:
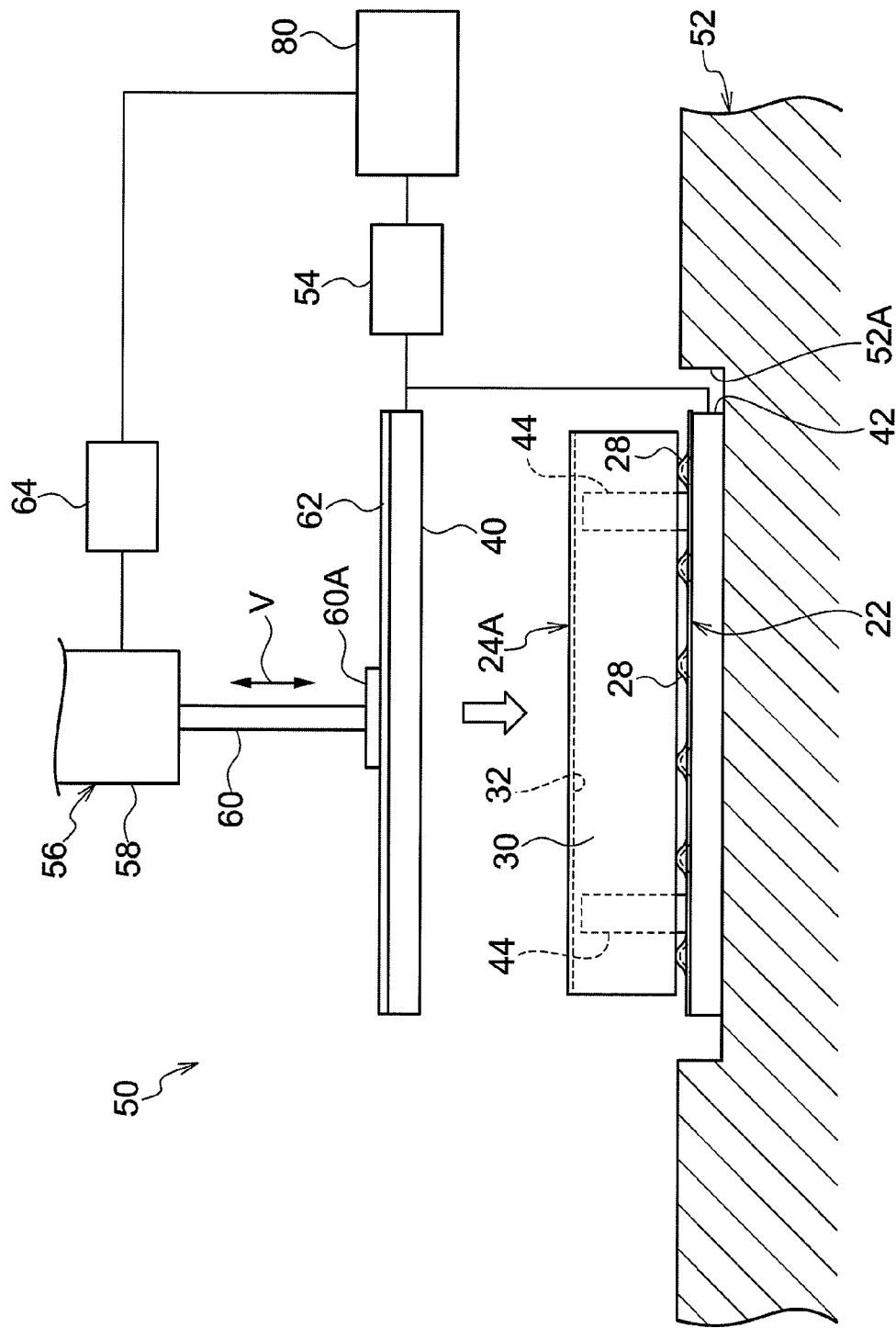
FIG. 5 is a side view illustrating a projection welding apparatus according to the first exemplary embodiment of the present invention.

As shown in FIG. 5, a projection welding apparatus 50 according to the first exemplary embodiment is provided with a support table 52, a lower flat plate electrode 42 serving as a first electrode, a upper flat plate electrode 40 serving as a second electrode, a raising and lowering mechanism 56 serving as a pressing unit and stopper members 44.

The lower flat plate electrode 42 is a plate shaped electrode, and is disposed substantially horizontally inside a housing recess 52A formed in a central portion of the support table 52. The upper flat plate electrode 40 is disposed above the lower flat plate electrode 42. The upper flat plate electrode 40 is a plate shaped electrode that is disposed substantially horizontally so as to face the lower flat plate electrode 42. The panel frame 22 and the reinforcement rib 24A are disposed between the lower flat plate electrode 42 and the upper flat plate electrode 40.

The upper flat plate electrode 40 and the lower flat plate electrode 42 are connected to a voltage supply source 54, and a voltage is applied across the upper flat plate electrode 40 and the lower flat plate electrode 42 using the voltage supply source 54. A controller 80 such as a control circuit is connected to the voltage supply source 54. Initiation or cessation of voltage application by the voltage supply source 54 to the upper flat plate electrode 40 and the lower flat plate electrode 42 is controlled by the controller 80.

The upper flat plate electrode 40 is supported so as to be moveable up and down by the raising and lowering mechanism 56. The raising and lowering mechanism 56 includes an air cylinder 58 and a press rod 60 that projects out from the air cylinder 58. The air cylinder 58 is disposed above the upper flat plate electrode 40 and is supported by a support frame, not shown in the drawings, whilst holding the leading end section 60A of the press rod 60 in a downwards facing state. The upper flat plate electrode 40 is attached to the leading end section 60A of the press rod 60 through an attachment bracket 62.

A vacuum pump 64 is connected to the air cylinder 58. Compressed air is fed into the air cylinder 58 by the vacuum pump 64. The upper flat plate electrode 40 is accordingly moved up or down (the arrow V directions) while maintaining a substantially horizontal orientation by the press rod 60 being pushed out from the air cylinder 58, or the press rod 60 being retracted into the air cylinder 58. When the upper flat plate electrode 40 is moved downwards and approaches the lower flat plate electrode 42, the reinforcement rib 24A disposed on the panel frame 22 is pressed by the bottom face (the support face) of the upper flat plate electrode 40. The controller 80 is connected to the vacuum pump 64. Initiation or cessation of compressed air supply by the vacuum pump 64 into the air cylinder 58 is controlled by the controller 80.

Figure 6:
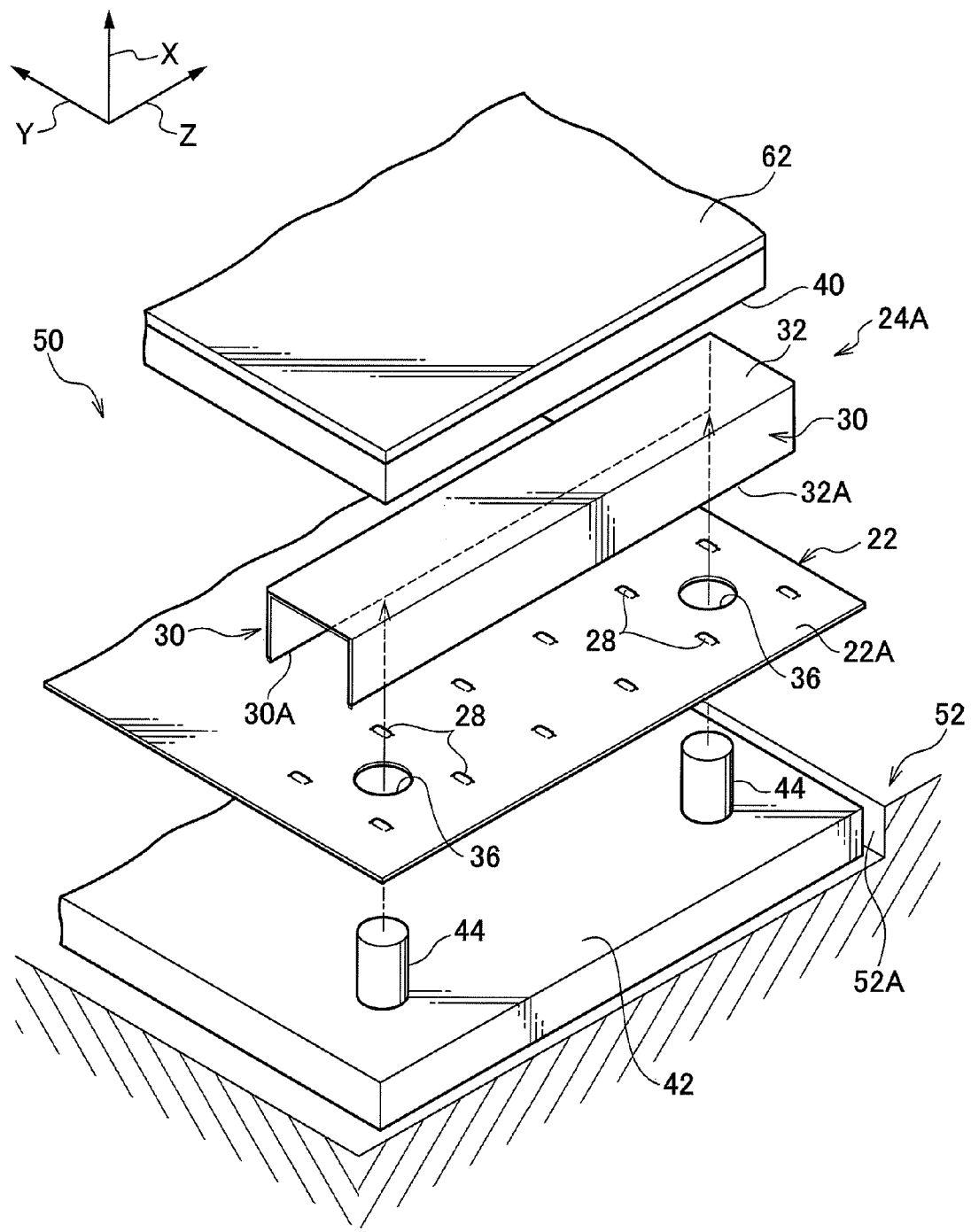
FIG. 6 is a perspective view illustrating a portion of a projection welding apparatus according to the first exemplary embodiment of the present invention.

As shown in FIG. 6, the pair of stopper members 44 are provided on the top face of the lower flat plate electrode 42 disposed on the rear face side of the panel frame 22 (the face on the opposite side to that of the surface 22A) for restricting the upper flat plate electrode 40 approaching the lower flat plate electrode 42. Each of the stopper members 44 is formed in a cylindrical pillar shape, projecting out from the top face of the lower flat plate electrode 42 towards the upper flat plate electrode 40. Each of the stopper members 44 is disposed at a position corresponding to respective length direction end portions of the reinforcement rib 24A, so as to be respectively insertable into the through holes 36 formed in the panel frame 22. The panel frame 22 can be mounted on the top face of the lower flat plate electrode 42 by the stopper members 44 being passed through the through holes 36 of the panel frame 22. The diameter of the through holes 36 of the panel frame 22 is larger than the diameter of the stopper members 44, such that the edges of the through holes 36 do not contact the stopper members 44.

Figure 7A:
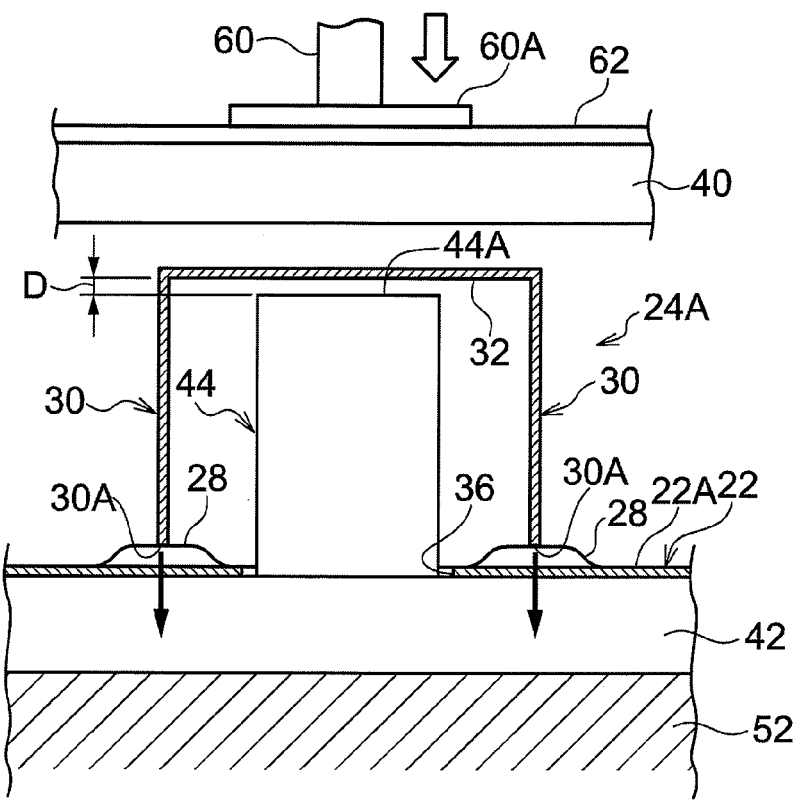
FIGS. 7A and 7B are cross-sections of a reinforcement rib and panel frame disposed in a projection welding apparatus according to the first exemplary embodiment of the present invention, viewed along the reinforcement rib length direction.
Figure 7B:
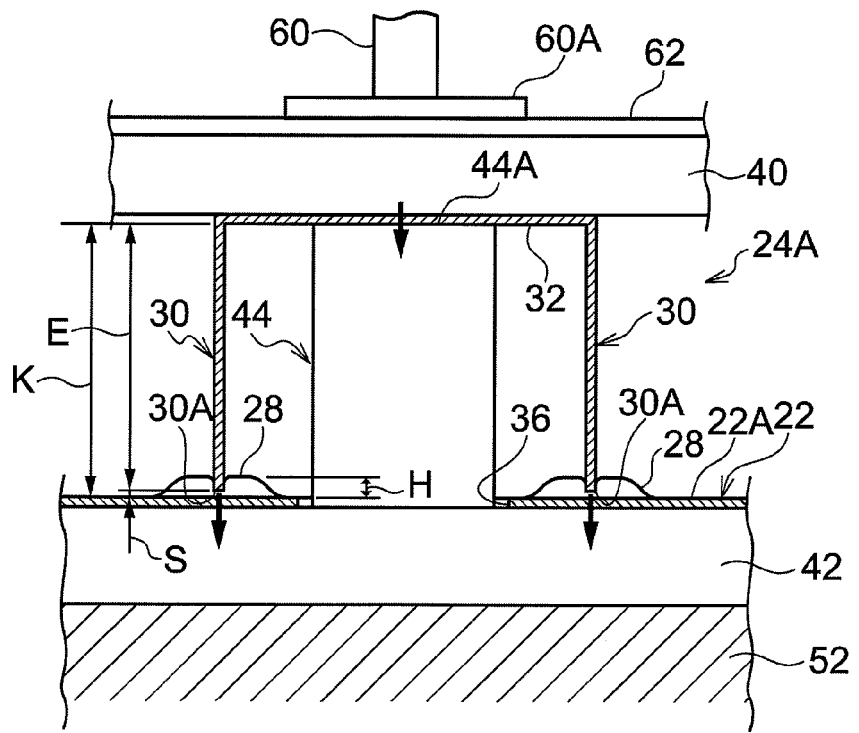

As shown in FIG. 7A, the stopper members 44 when inserted through the through holes 36 of the panel frame 22 are disposed inside the reinforcement rib 24A mounted on the welding projections 28 of the panel frame 22. In other words, the stopper members 44 are disposed between the lower flat plate electrode 42 and the web portion 32 of the reinforcement rib 24A. The stopper members 44 are disposed inside the reinforcement rib 24A in a state in which there is a separation D open between the top face (contact face) 44A of the stopper members 44 and the web portion 32 of the reinforcement rib 24A. As shown in FIG. 7B, the reinforcement rib 24A is pressed by the upper flat plate electrode 40 such that the web portion 32 of the reinforcement rib 24A contacts the stopper members 44. The inside (the panel frame 22 side) of the web portion 32 of the reinforcement rib 24A is supported by the stopper members 44, so as to restrict the upper flat plate electrode 40 from approaching the lower flat plate electrode 42. A separation S is accordingly left open between the surface 22A of the panel frame 22 and the end faces 30A of the flange portions 30 in a state in which the end faces 30A of the flange portions 30 are welded to the welding projections 28 of the panel frame 22. The height K of the stopper members 44 and the extension direction height (extension height) E of the flange portions 30 extending from the web portion 32 of the reinforcement rib 24A towards the panel frame 22 are set within a range such that extension height E<height K<(extension height E+height H of the welding projections 28), and the each dimension is arranged such that each of the welding projections 28 reaches a specific temperature (required heat amount) in the interval up to when the web portion 32 of the reinforcement rib 24A contacts the top faces 44A of the stopper members 44 when projection welding is performed.

The stopper members 44 are also configured from an electrically conductive material (for example a metal such as copper, silver, gold or platinum). Accordingly, the web portion 32 of the reinforcement rib 24A and the lower flat plate electrode 42 are electrically connected through the stopper members 44 when the web portion 32 of the reinforcement rib 24A contacts the top face 44A of the stopper members 44. Namely, the stopper members 44 function as a bypass circuit for current to bypass the panel frame 22.

Note that it is not essential for the whole of the stopper members 44 to be configured from an electrically conductive material. For example, configuration may be made such that the top face (contact face) 44A of the stopper members 44 is covered with an electrically conductive material and the covering layer formed is then connected by wiring, such as a copper wire, to the lower flat plate electrode 42. Such factors as the shape, placement, and number of stopper members 44 and the through holes 36 into which the stopper members 44 are inserted may be varied as appropriate.

Explanation follows regarding a projection welding method according to the first exemplary embodiment.

Explanation first follows regarding a stopper member placement process. In the stopper member placement process, as shown in FIG. 6, the stopper members 44 are inserted through the through holes 36 formed in the panel frame 22, and the panel frame 22 is disposed on the top face of the lower flat plate electrode 42 with the surface 22A in an upwards facing state. Then, as shown in FIG. 7A, the end faces 30A of the flange portions 30 are placed on the plural welding projections 28 formed on the surface 22A of the panel frame 22 such that the stopper members 44 enter between the flange portions 30 of the reinforcement rib 24A. The stopper members 44 are disposed inside the reinforcement rib 24A in a state in which the separation D is open between the web portion 32 and the top face 44A of the stopper members 44.

Explanation follows regarding a welding process. In the welding process, as shown in FIG. 5, the vacuum pump 64 is driven by the controller 80, the press rod 60 is pushed out from the air cylinder 58, and the upper flat plate electrode 40 moved downwards. The reinforcement rib 24A is pressed downwards by the moved upper flat plate electrode 40, and the panel frame 22 and the reinforcement rib 24A are nipped between the upper flat plate electrode 40 and the lower flat plate electrode 42. Then, as shown in FIG. 7B, the upper flat plate electrode 40 is further moved downwards until the web portion 32 of the reinforcement rib 24A contacts the top face 44A of the stopper members 44, and a voltage is applied to the upper flat plate electrode 40 and the lower flat plate electrode 42 by the voltage supply source 54 (see FIG. 5) while the end faces 30A of the flange portions 30 are being pressed against the welding projections 28 of the panel frame 22. Current accordingly flows in the contact portions (welding portions) of the welding projections 28 and the end faces 30A of the flange portions 30, and the temperature of the welding projections 28 rises due to resistive heat generation. The welding projections 28 soften as they rise in temperature, and the softened welding projections 28 are pressed and squashed by the flange portions 30, and the welding projections 28 are welded to the flange portions 30. As a result the end faces 30A of the flange portions 30 are welded at the same time by simultaneous welding to the plural welding projections 28 in a state in which the separation S is open between the surface 22A of the panel frame 22 and the end faces 30A of the flange portions 30.

Voltage application by the voltage supply source 54 to the upper flat plate electrode 40 and the lower flat plate electrode 42 is then stopped, the welding projections 28 cool and harden, and the flange portions 30 are joined to the welding projections 28.

In the present exemplary embodiment, a voltage is applied to the upper flat plate electrode 40 and the lower flat plate electrode 42 after nipping the panel frame 22 and the reinforcement rib 24A between the upper flat plate electrode 40 and the lower flat plate electrode 42, however voltage may be applied to the upper flat plate electrode 40 and the lower flat plate electrode 42 before the panel frame 22 and the reinforcement rib 24A are nipped between the upper flat plate electrode 40 and the lower flat plate electrode 42.

Explanation follows regarding operation of the first exemplary embodiment.

In the present exemplary embodiment, as described above, the stopper members 44 are inserted into the through holes 36 formed in the panel frame 22, and the stopper members 44 are disposed inside the reinforcement rib 24A in a state in which the separation D is open between the web portion 32 of the reinforcement rib 24A and the top face 44A of the stopper members 44. The web portion 32 of the reinforcement rib 24A contacts the top face 44A of the stopper members 44 before the end faces 30A of the flange portions 30 of the reinforcement rib 24A contact the surface 22A of the panel frame 22, restricting the reinforcement rib 24A from contacting the panel frame 22, and restricting approach of the upper flat plate electrode 40 to the lower flat plate electrode 42. The end faces 30A of the flange portions 30 are thereby welded to the plural welding projections 28 formed on the surface 22A of the panel frame 22 in a state in which the separation S is open between the surface 22A of the panel frame 22 and the end faces 30A of the flange portions 30.

Contact between the surface 22A of the panel frame 22 and the end faces 30A of the flange portions 30 is accordingly suppressed, and current can be suppressed from splitting at locations other than the contact portions between the welding projections 28 of the panel frame 22 and the end faces 30A of the flange portions 30. As a result a desirable amount of current flows in the contact portions between the welding projections 28 and the end faces 30A of the flange portions 30, and the welding projections 28 are heated to a desirable temperature. The desired weld quality can accordingly be achieved.

Due to provision of the separation S between the surface 22A of the panel frame 22 and the end faces 30A of the flange portions 30, tolerance in the dimensions of each member, due to unevenness or distortion arising from, for example manufacturing tolerance in the surface 22A of the panel frame 22 and the end faces 30A of the flange portions 30 or in the support faces of the upper flat plate electrode 40 and the lower flat plate electrode 42, can be accommodated. Namely the flatness precision required for the surface 22A of the panel frame 22 and the end faces 30A of the flange portions 30 is mitigated. The cost of manufacturing the panel frame 22 and the reinforcement rib 24A can accordingly be reduced. The manufacturing cost of the projection welding apparatus 50 can also be reduced since the flatness precision requirement is relaxed for the support faces, such as the upper flat plate electrode 40 and the lower flat plate electrode 42, and the movement precision requirement is also relaxed for the raising and lowering mechanism 56 for parallel moving of the upper flat plate electrode 40.

The web portion 32 and the lower flat plate electrode 42 are electrically connected through the stopper members 44 when the web portion 32 of the reinforcement rib 24A and the top face 44A of the stopper members 44 contact, and current bypasses the panel frame 22 and flows between the web portion 32 and the lower flat plate electrode 42. Namely, after the welding projections 28 have been heated to the specific temperature and welding completed, any superfluous current is bypassed, and flows through the stopper members 44 between the web portion 32 of the reinforcement rib 24A and the lower flat plate electrode 42. As a result, superfluous current flowing through the contact portions (welding portions) of the welding projections 28 and the end faces 30A of the flange portions 30 is reduced, and the amount of heat generated in the welding projections 28 is reduced.

If, for example, the plural welding projections 28 do not contact the end faces 30A of the flange portions 30 all at the same time, or substantially at the same time, due to variation in the height of the welding projections 28 caused by manufacturing tolerance or distortion of the reinforcement rib 24A or the end faces 30A of the flange portions 30, then the duration of current flow at a particular welding projection 28 that contacts the end face 30A of the flange portion 30 first is longer than the duration of current flow of the other welding projections 28. In such cases, the amount of heat generated in the welding projection 28 that contacted the end face 30A of the flange portion 30 first is excessive, and there is a possibility of molten material spattering.

However, in order to address this issue, in the present exemplary embodiment, even if a particular welding projection 28 contacts the end face 30A of the flange portion 30 earlier, as explained above, superfluous current bypasses, and flows between the web portion 32 of the reinforcement rib 24A and the lower flat plate electrode 42 through the stopper members 44 due to the web portion 32 of the reinforcement rib 24A contacting the top face 44A of the stopper members 44. Any excessive current flowing to the panel frame 22 is accordingly reduced during the welding process. Excess current supply to the welding projection 28 that first contacts the end face 30A of the flange portion 30 is thereby suppressed, and molten material can be suppressed from spattering due to the amount of heat generated in the first contacting welding projections 28 being reduced.

The current flowing through the stopper members 44 between the web portion 32 of the reinforcement rib 24A and the lower flat plate electrode 42 increases and decreases according to the electrical resistance of the stopper members 44, enabling regulation of current flowing in the welding projections 28.

The stopper members 44 pass through the through holes 36 formed in the panel frame 22 and the stopper members 44 are disposed inside the reinforcement rib 24A, such that the stopper members 44 can accordingly be disposed at specific positions inside the reinforcement rib 24A. Variation can accordingly be reduced in the separation S between the surface 22A of the panel frame 22 and the end faces 30A of the flange portions 30.

As explained above, in the present exemplary embodiment, contact between the surface 22A of the panel frame 22 and the end faces 30A of the flange portions 30 is suppressed at locations other than the contact portions (welding portions) of the welding projections 28 formed to the surface 22A of the panel frame 22 and the end faces 30A of the flange portions 30 of the reinforcement rib 24A, and molten material can be suppressed from spattering. The manufacturing cost of the rear seat back 14 can accordingly be reduced while still maintaining weld quality.

Explanation follows regarding a second exemplary embodiment. The same reference numerals are appended to configurations similar to those of the first exemplary embodiment and further explanation thereof is omitted.

Figure 8:
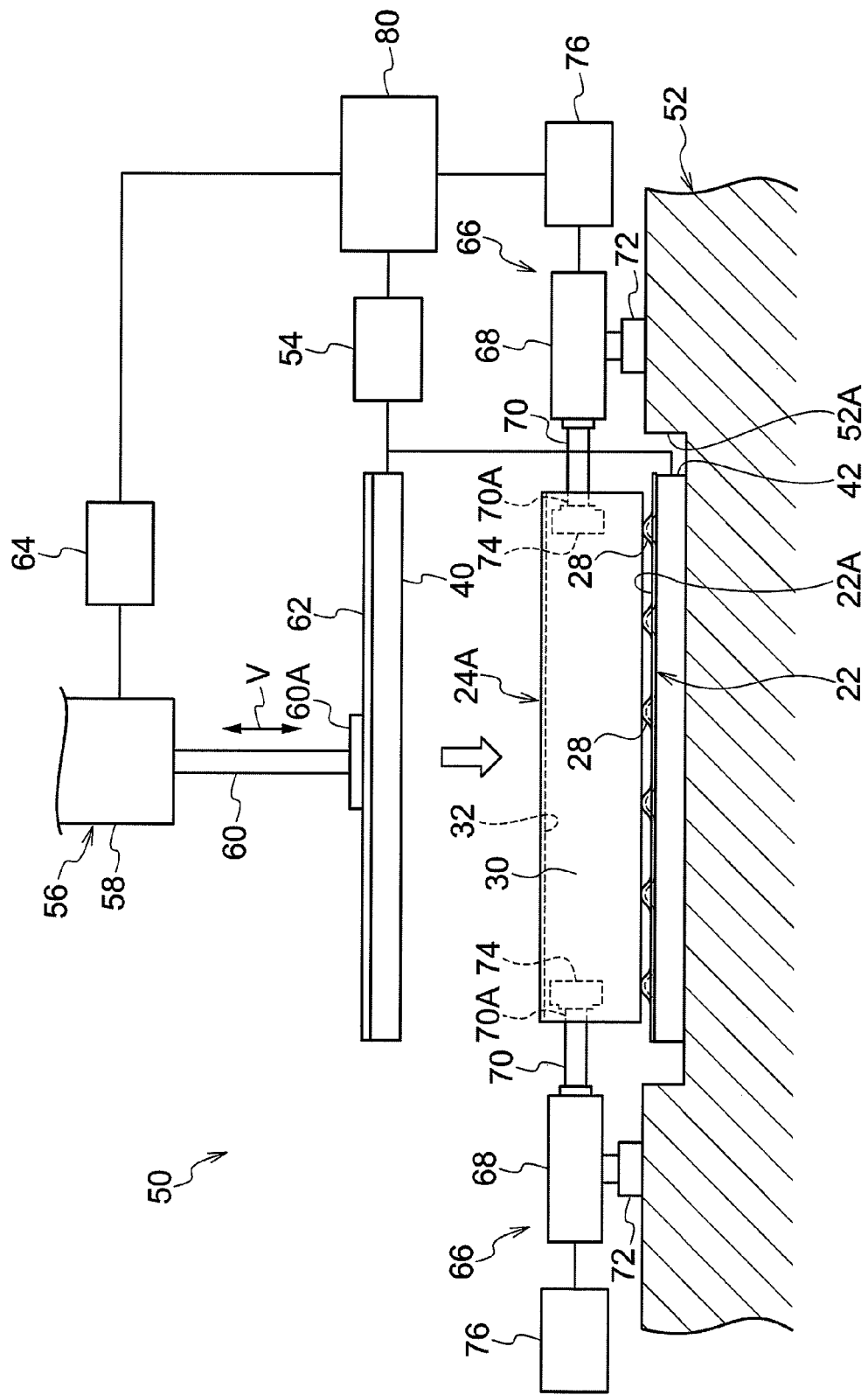
FIG. 8 is a side view illustrating a projection welding apparatus according to a second exemplary embodiment of the present invention.

As shown in FIG. 8, the projection welding apparatus 90 according to the second exemplary embodiment is equipped with stopper members 74 in place of the stopper members 44 of the first exemplary embodiment. The projection welding apparatus 90 is also equipped with a pair of moving mechanisms 66 serving as moving units.

The pair of moving mechanisms 66 is disposed on the support table 52 at the edges of the housing recess 52A, facing each other with the lower flat plate electrode 42 disposed therebetween. Each of the moving mechanisms 66 is equipped with an air cylinder 68, a support rod 70 that protrudes out from the air cylinder 68, and a raising and lowering base 72 for supporting the air cylinder 68. The air cylinders 68 are disposed at the two length direction sides of the reinforcement rib 24A with the leading end portions 70A of the support rods 70 aligned with each other in a facing state. Axial direction central portions of the air cylinders 68 are supported by the raising and lowering base 72.

The stopper members 74 are provided at the leading end portions 70A of the support rod 70 for limiting approach of the upper flat plate electrode 40 to the lower flat plate electrode 42. The stopper members 74 are, as shown in FIG. 10A, configured in a rectangular shape as viewed along the support rod 70 axial direction.

Figure 9:
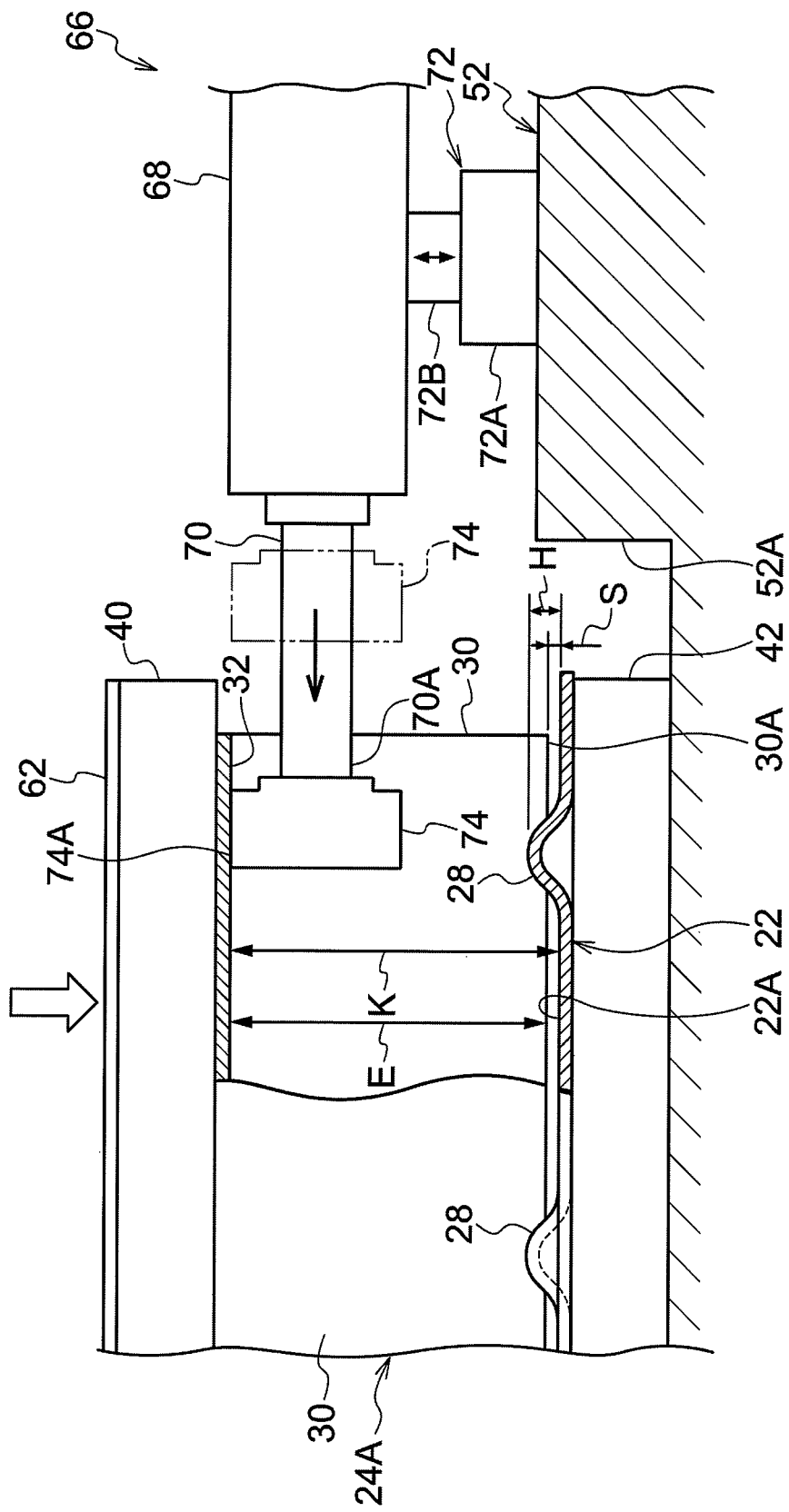
FIG. 9 is a partial enlarged view of the projection welding apparatus according to the second exemplary embodiment of the present invention illustrated in FIG. 8.

As shown in FIG. 8, a vacuum pump 76 is connected to the air cylinders 68. Compressed air is supplied into the air cylinders 68 by the vacuum pump 76, so as to push the support rods 70 out from the air cylinders 68 or pull the support rods 70 into the air cylinders 68. Consequently, as shown in FIG. 9, the stopper members 74 are moveable in a horizontal direction between a restricting position inside the reinforcement rib 24A (a position illustrated in solid lines) and a retracted position outside the reinforcement rib 24A (a position illustrated by double-dot intermittent lines). As shown in FIG. 8, the vacuum pump 76 is connected to the controller 80. Initiation and cessation of the supply of compressed air by the vacuum pump 76 into the air cylinders 68 is controlled by the controller 80. The connection line between the left hand side of the vacuum pump 76 and the controller 80 has been omitted from illustration in FIG. 8.

As shown in FIG. 9, the raising and lowering bases 72 for supporting the air cylinders 68 are provided with cylindrical shaped bases 72A that are fixed to the support table 52, and circular cylindrical shaped movable support pillars 72B that project out from the bases 72A are fixed to the air cylinders 68. A raising and lowering mechanism such as a ball screw, not shown in the drawings, is provided to each of the raising and lowering bases 72, so as to move each of the movable support pillars 72B up or down. The height (separation distance) K from the surface 22A of the panel frame 22 to a top face 74A of each of the stopper members 74 is adjustable. By adjusting the height K of each of the stopper members 74 using the raising and lowering bases 72, the separation (gap) S is left open between the surface 22A of the panel frame 22 and the end faces 30A of the flange portions 30 in the state in which the end faces 30A of the flange portions 30 are welded to the welding projections 28 of the panel frame 22. If E is employed to denote the extension direction length (extension length) of the flange portions 30 similarly to in first exemplary embodiment, then the height K of the stopper members 74 is set in a range such that extension length E<height K<(extension length E+height H of the welding projections 28), and the each dimension is arranged such that each of the welding projections 28 reaches a specific temperature (required amount of heat generation) in the interval until when the web portion 32 of the reinforcement rib 24A contacts the top faces 74A of the stopper members 74. Note that the shape of the stopper members 74 may be changed as appropriate.

Figure 10A:
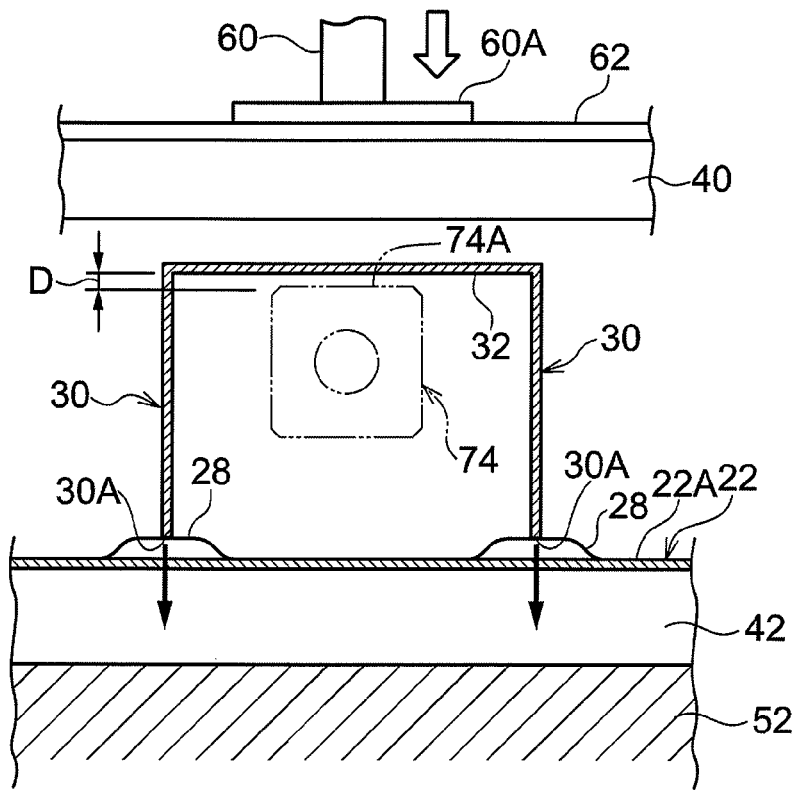
FIGS. 10A and 10B are cross-sections of a reinforcement rib and panel frame disposed in a projection welding apparatus according to the second exemplary embodiment of the present invention viewed along the reinforcement rib length direction.
Figure 10B:
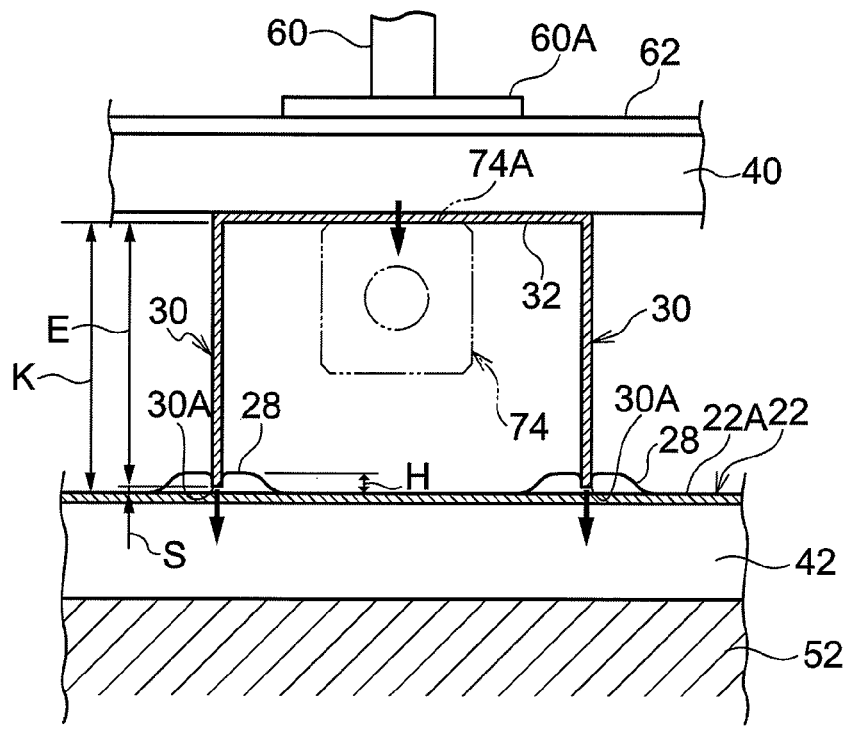

As shown in FIG. 10A, in the restricting position, the stopper members 74 are disposed inside the reinforcement rib 24A in a state in which the separation D is open between the top faces 74A and the web portion 32 of the reinforcement rib 24A, such that, as shown in FIG. 10B, the web portion 32 of the reinforcement rib 24A is pressed by the upper flat plate electrode 40 against the top faces (contact faces) 74A of the stopper members 74. The web portion 32 of the reinforcement rib 24A is supported by the stopper members 74 from the inside (the panel frame 22 side), such that the reinforcement rib 24A is restricted from approaching the panel frame 22, and the upper flat plate electrode 40 is restricted from approaching the lower flat plate electrode 42.

The stopper members 74 are configured from an electrically conductive material (for example a metal such as copper, silver, gold or platinum), and are electrically connected to the lower flat plate electrode 42 by wiring, such as copper wire, not shown in the drawings. Accordingly, when the web portion 32 of the reinforcement rib 24A contacts the top faces 74A of the stopper members 74, the web portion 32 and the lower flat plate electrode 42 become electrically connected to each other through the stopper members 74. Namely, the stopper members 74 function as a current bypass for current to bypath the panel frame 22.

Note that it is not essential for the whole of the stopper members 74 to be configured from an electrically conductive material. For example, the top faces (contact faces) 74A of the stopper members 74 are covered with an electrically conductive material and the covering layer formed is then connected to the lower flat plate electrode 42 by wiring, such as copper wire.

As shown in FIG. 9, in the retracted position away from the restricting position (the position illustrated by the double-dot intermittent lines), the stopper members 74 are positioned outside the reinforcement rib 24A, such that the stopper members 74 do not interfere with the panel frame 22 or the reinforcement rib 24A. The welded panel frame 22 and reinforcement rib 24A are accordingly easily removed from between the upper flat plate electrode 40 and the lower flat plate electrode 42.

Explanation follows regarding a projection welding method according to the second exemplary embodiment.

Explanation first follows regarding a stopper member placement process. In the stopper member placement process, as shown in FIG. 8, the panel frame 22 is mounted to the top face of the lower flat plate electrode 42 with the surface 22A in an upwards facing state. The end faces 30A of the flange portions 30 of the reinforcement rib 24A are then mounted to the plural welding projections 28 formed to the surface 22A of the panel frame 22. The vacuum pump 76 is then driven by the controller 80, as shown in FIG. 9, and the support rods 70 are pushed out from the air cylinders 68 and the stopper members 74 that are positioned in the retracted position (the position illustrated by the double-dot intermittent lines) are moved to the restricting position inside the reinforcement rib 24A (the position illustrated by solid lines). The stopper members 74 are thereby disposed inside the reinforcement rib 24A in a state in which the separation D (see FIG. 10A) is open between the top faces 74A and the web portion 32 of the reinforcement rib 24A.

Explanation follows regarding a welding process. In the welding process, as shown in FIG. 8, the vacuum pump 64 is driven by the controller 80, and the press rod 60 is pushed out from the air cylinder 58, moving the upper flat plate electrode 40 downwards. The reinforcement rib 24A is pressed downwards by the moved upper flat plate electrode 40, nipping the panel frame 22 and the reinforcement rib 24A between the upper flat plate electrode 40 and the lower flat plate electrode 42. Then, as shown in FIG. 9, the upper flat plate electrode 40 is moved downwards until the web portion 32 of the reinforcement rib 24A contacts the top faces 74A of the stopper members 74, and voltage is applied by the voltage supply source 54 to the upper flat plate electrode 40 and the lower flat plate electrode 42 while the end faces 30A of the flange portions 30 are being pressed against the welding projections 28 of the panel frame 22. The end faces 30A of the flange portions 30 are accordingly welded at the same time to the plural welding projections 28 by simultaneous welding in a state in which the separation S is open between the surface 22A of the panel frame 22 and the end faces 30A of the flange portions 30.

Explanation follows regarding a retraction process. In the retraction process, the vacuum pump 76 is driven by the controller 80 (see FIG. 8), and as shown in FIG. 9, the support rods 70 inside the air cylinders 68 are pulled in so as to move the stopper members 74 from the restricting position (the position illustrated by solid lines) to the retracted position (the position illustrated by double-dot intermittent lines). The vacuum pump 64 is driven by the controller 80 (see FIG. 5), and the press rod 60 is pulled in to the air cylinder 58, and the upper flat plate electrode 40 is moved upwards. A state is thereby achieved in which the welded panel frame 22 and reinforcement rib 24A can be removed from between the upper flat plate electrode 40 and the lower flat plate electrode 42.

Note that regarding the process to move the stopper members 74 to the retracted position and the process to move the upper flat plate electrode 40 upwards, either one of the processes can be performed prior to the other process.

Explanation follows regarding operation of the second exemplary embodiment.

In the present exemplary embodiment, as described above, stopper members 74 are disposed in the restricting position inside the reinforcement rib 24A in a state in which the separation D is open between the web portion 32 of the reinforcement rib 24A and the top faces 74A of the stopper members 74. The web portion 32 of the reinforcement rib 24A contacts the top faces 74A of the stopper members 74 prior to the end faces 30A of the flange portions 30 of the reinforcement rib 24A contacting the surface 22A of the panel frame 22, thereby restricting approach of the reinforcement rib 24A to the panel frame 22 and restricting approach of the upper flat plate electrode 40 to the lower flat plate electrode 42. The end faces 30A of the flange portions 30 are accordingly welded to the plural welding projections 28 formed to the surface 22A of the panel frame 22 in a state in which the separation S is open between the surface 22A of the panel frame 22 and the end faces 30A of the flange portions 30.

The web portion 32 of the reinforcement rib 24A is electrically connected to the lower flat plate electrode 42 through the stopper members 74 when the web portion 32 of the reinforcement rib 24A contacts the top faces 74A of the stopper members 74, and current bypasses the panel frame 22 and flows between the web portion 32 and the lower flat plate electrode 42. As a result, the current flowing in the contact portions (welding portions) of the welding projections 28 and the end faces 30A of the flange portions 30 is reduced, and the amount of heat generated in the welding projections 28 is reduced. Similar advantageous effects can accordingly be obtained to those of the first exemplary embodiment.

In the present exemplary embodiment, after welding of the panel frame 22 and the reinforcement rib 24A has been completed, the stopper members 74 are moved by the moving mechanisms 66 from the restricting position inside the reinforcement rib 24A to the retracted position outside the reinforcement rib 24A. The stopper members 74 accordingly do not impede when the welded panel frame 22 and reinforcement rib 24A are taken out from between the upper flat plate electrode 40 and the lower flat plate electrode 42, and the panel frame 22 and the reinforcement rib 24A can be easily removed. Productivity is therefore improved.

A reduction in processing costs of the panel frame 22 can be achieved in comparison to the first exemplary embodiment, since there is no need to form the through holes 36 in the panel frame 22.

As explained above, according to the present exemplary embodiment, contact between the surface 22A of the panel frame 22 and the end faces 30A of the flange portions 30 is suppressed at locations other than the contact portions (welding portions) of the welding projections 28 formed to the surface 22A of the panel frame 22 and the end faces 30A of the flange portions 30 of the reinforcement rib 24A, and molten material is also suppressed from being spattered due to excessive current flowing. A saving can accordingly be achieved in the manufacturing cost of the rear seat back 14, while still ensuring weld quality.

In the present exemplary embodiment, the moving mechanisms 66 that are provided with components such as the air cylinders 68 (see FIG. 5) are employed, however there is no particular limitation thereto. Any moving unit may be employed capable of supporting such that the stopper members 74 are moveable between the restricting position and the retracted position, and for example a hydraulic cylinder, a solenoid or an electrical slider may be employed. Alternatively the moving unit may be eliminated, with, for example, an operator placing the stopper members 74 between the panel frame 22 and the reinforcement rib 24A. When such an approach is adopted, the stopper members 74 may be supported by a frame or the like fixed to the support table 52, such that contact between the panel frame 22 and the stopper members 74 is avoided.

Explanation follows regarding modified examples of the first and second exemplary embodiments.

While in the first and second exemplary embodiments, the panel frame 22 is formed in a flat panel shape as the first plate member, the first plate member may be any plate member provided with a surface (flat face) on which it is possible to form welding projections, and a cross-sectional profile of for example a C-shape or L-shape may be employed. Furthermore, while the reinforcement rib 24A with rectangular C-shaped cross-section serves as a second plate member, an L-shape or H-shape for example may be employed as the cross-sectional profile of the second plate member. When an H-shaped second plate member is employed, the upper flat plate electrode 40 is placed in contact with the top edge portions of the flanges without the web portion of the H-shaped second plate member, and the upper flat plate electrode 40 is pressed downwards. Note that although the flange portions (extension portions) of the second plate member are not necessarily substantially perpendicular to the surface of the first plate member, the flange portions are preferably substantially perpendicular to the surface of the first plate member in consideration of the efficiency of pressing force transmission between the first plate member and the second plate member during welding.

Whereas in the above exemplary embodiments, the raising and lowering mechanism 56 provided with the air cylinder 58 is employed as a pressing unit, there is no limitation thereto. Various types of raising and lowering mechanism can be employed as the pressing unit as long the upper flat plate electrode 40 can be supported so as to be able to approach or move away from the lower flat plate electrode 42, and for example a hydraulic cylinder may be employed.

The profile of the welding projections 28 is also not limited to a substantially oval profile, and for example a circular profile may be employed. The number and placement of the welding projections 28 may be varied as appropriate, as long as there is at least one of the welding projections 28.

In the above exemplary embodiments, examples of projection welding of the panel frame 22 and the reinforcement member 24A for configuring the rear seat back frame 18 have been explained. However, the above exemplary embodiments are applicable to various plate members capable of projection welding, and are applicable, for example, to a vehicle door frame, a cabinet frame for electrical equipment, or a construction member.

Whereas the present invention has been explained by way of the first and second exemplary embodiments, the present invention is not limited by such exemplary embodiments. Obviously any appropriate combinations may be made of the above exemplary embodiments and the various examples of modifications, and various embodiments may be implemented within a range not departing from the spirit of the present invention.

What is claimed is:

1. A projection welding apparatus for welding a first plate member, that has a plurality of welding projections formed on a front-face side, to a second plate member, the apparatus comprising:
    a first electrode disposed on a back-face side of the first plate member;
    a second electrode disposed to face the first electrode, the first plate member and the second plate member being configured to be provided between the first electrode and the second electrode, the second plate member being configured to include a facing portion that faces the front-face side of the first plate member and an extension portion that extends from the facing portion towards the first plate member and an extension direction end face of the extension portion is configured to abut with the welding projections;
    a pressing unit that causes the second electrode to approach the first electrode, presses the second plate member with the second electrode, and presses the end face of the extension portion against the welding projections;
    a voltage application unit that applies a voltage to the first electrode and the second electrode causing current to flow in the first plate member and the second plate member; and
    a stopper member that is electrically conductive, is disposed between the first electrode and the facing portion with a separation open to the facing portion, is contacted against the facing portion of the second plate member that is configured to be pressed by the second electrode, restricts the first electrode and the second electrode from approaching each other and electrically connects the facing portion and the first electrode so as to bypass the first plate member,
    wherein the second plate member is configured to have a C-shaped cross-section and the stopper member is provided inside the C-shaped cross-section of the second plate member.

2. The projection welding apparatus of claim 1 wherein the stopper member projects out from the first electrode towards the second electrode, passes through a through hole formed in the first plate member, and is disposed between the first electrode and the facing portion.

3. The projection welding apparatus of claim 1 wherein:
    the projection welding apparatus further comprises a moving unit for supporting the stopper member so as to be capable of moving between a restricting position between the first plate member and the facing portion, and a retracted position away from the restricting position; and
    the stopper member is disposed between the first plate member and the facing portion with a separation open to the first plate member.

4. The projection welding apparatus of claim 1, wherein the stopper member contacts the facing portion prior to the front face of the first plate member contacting the end face of the extension portion.

5. A projection welding apparatus for welding first and second welding members, the apparatus comprising:
    a first electrode;
    a second electrode facing the first electrode;
    a press section that causes the second electrode to approach the first electrode;
    a voltage application section that applies a voltage to the first electrode and the second electrode; and
    an electrically conductive stopper member disposed between the first electrode and the second electrode, electrically connected to the first electrode and not in contact with the second electrode, wherein:
        the first and second welding members are configured to be disposed between the first electrode and the second electrode such that current from the first electrode and the second electrode flows through the first welding member and the second welding member so as to weld together the first welding member and the second welding member,
        the first electrode and the second electrode are electrically connected through the first welding member and the second welding member, and
        the first electrode and the second electrode are restricted from approaching each other by the stopper member and are electrically connected through the second welding member and the stopper member so as to bypass the first welding member,
    wherein the second welding member is configured to have a C-shaped cross-section and the stopper member is provided inside the C-shaped cross-section of the second welding member.

6. The projection welding apparatus of claim 5 wherein the stopper member projects out from the first electrode towards the second electrode.

7. The projection welding apparatus of claim 5 wherein:
    the projection welding apparatus further comprises a moving unit for movably supporting the stopper member; and
    the stopper member is moved by the moving unit between a restricting position disposed between the first welding member and the second welding member, and a retracted position away from the first welding member and the second welding member.

8. The projection welding apparatus of claim 5 wherein:
    the first welding member is configured to have a base plate and a plurality of welding projections provided to the base plate;
    when the second electrode is caused to approach the first electrode, the second electrode presses the second welding member against the welding projections of the first welding member;
    after the second welding member has contacted the welding projections of the first welding member and before the second welding member contacts with the base plate of the first welding member, the stopper member is configured to contacts the second welding member, such that the first electrode and the second electrode are electrically connected to each other through the second welding member and the stopper member.

* * * * *